(12) United States Patent
Nelson et al.

(10) Patent No.: US 7,613,546 B2
(45) Date of Patent: Nov. 3, 2009

(54) MODULAR IRRIGATION CONTROLLER

(75) Inventors: Arnold Nelson, Redlands, CA (US); Richard Jeff Garcia, Yucaipa, CA (US); Greg Parker, San Diego, CA (US)

(73) Assignee: The Toro Company, Bloomington, MN (US)

( * ) Notice: Subject to any disclaimer, the term of this patent is extended or adjusted under 35 U.S.C. 154(b) by 561 days.

(21) Appl. No.: 11/199,103

(22) Filed: Aug. 8, 2005

(65) Prior Publication Data

US 2006/0030971 A1    Feb. 9, 2006

Related U.S. Application Data

(60) Provisional application No. 60/599,598, filed on Aug. 6, 2004.

(51) Int. Cl.
*G05D 7/00* (2006.01)
*G05D 11/00* (2006.01)
*G05B 11/01* (2006.01)
*A01G 25/00* (2006.01)
*B05B 1/08* (2006.01)
*G05B 23/02* (2006.01)

(52) U.S. Cl. .......................... 700/284; 700/12; 700/19; 239/63; 239/69; 239/99; 340/3.1

(58) Field of Classification Search .................. 700/12, 700/19, 20, 22, 284; 239/63–66, 68, 69, 239/99; 340/3.1, 3.22
See application file for complete search history.

(56) References Cited

U.S. PATENT DOCUMENTS

| | | | |
|---|---|---|---|
| 2,688,056 A | 8/1954 | Kettering et al. | |
| 3,808,385 A | 4/1974 | Klinefelter | |
| 3,869,854 A | 3/1975 | Church | |
| 4,064,507 A | 12/1977 | Schmitz | |
| 4,090,764 A | 5/1978 | Malsby et al. | |
| 4,152,750 A | 5/1979 | Bremenour et al. | |
| 4,242,721 A | 12/1980 | Krolak et al. | |
| 4,264,902 A | 4/1981 | Miller | |
| 4,313,042 A | 1/1982 | Ehrhart | |
| 4,396,149 A | 8/1983 | Hirsch | |
| 4,569,020 A | 2/1986 | Snoddy et al. | |
| 4,655,076 A | 4/1987 | Weihe et al. | |
| 4,672,510 A | 6/1987 | Castner | |
| 4,684,920 A | 8/1987 | Reiter | |
| 4,690,020 A | 9/1987 | Sasano et al. | |

(Continued)

OTHER PUBLICATIONS

Rain Bird, Central Control System, Maxicom, Jun. 1994, pp. 2-8, Rain Bird Sales, Inc., Tucson, AZ.

(Continued)

*Primary Examiner*—Sean P Shechtman
(74) *Attorney, Agent, or Firm*—Inskeep IP Group, Inc.

(57) ABSTRACT

The present invention provides a modular controller that connects to irrigation modules with varying station terminals and a standard footprint size. Additionally, the modular controller includes surge protection options, wireless communication with PDA's and other external devices, no required position for each controller module to be connected, immediate display of station modules on the LCD display, retention of a water program if module is removed, communications module for flow monitoring, a modular transformer, rain sensor receiver within the housing, an improved 9-volt batter holder, and other aspects described in the present application.

5 Claims, 16 Drawing Sheets

U.S. PATENT DOCUMENTS

| | | | |
|---|---|---|---|
| 4,760,547 | A | 7/1988 | Duxbury |
| 4,852,051 | A | 7/1989 | Mylne, III |
| 4,862,701 | A | 9/1989 | Small et al. |
| 4,922,407 | A | 5/1990 | Birk et al. |
| 4,922,433 | A | 5/1990 | Mark |
| 4,937,732 | A | 6/1990 | Brundisini |
| 5,060,859 | A | 10/1991 | Bancroft |
| 5,087,886 | A | 2/1992 | Mann |
| 5,101,083 | A | 3/1992 | Tyler et al. |
| 5,173,855 | A | 12/1992 | Nielsen et al. |
| 5,262,936 | A | 11/1993 | Faris et al. |
| 5,265,005 | A | 11/1993 | Schmidt et al. |
| 5,272,620 | A | 12/1993 | Mock et al. |
| 5,278,749 | A | 1/1994 | De Man |
| 5,293,554 | A | 3/1994 | Nicholson |
| 5,333,785 | A | 8/1994 | Dodds et al. |
| 5,355,122 | A | 10/1994 | Erickson |
| 5,363,290 | A | 11/1994 | Doup et al. |
| 5,381,331 | A | 1/1995 | Mock et al. |
| 5,410,717 | A | 4/1995 | Floro |
| 5,414,618 | A | 5/1995 | Mock et al. |
| 5,421,738 | A | 6/1995 | Roberts |
| 5,424,649 | A | 6/1995 | Gluck et al. |
| 5,465,904 | A | 11/1995 | Vaello |
| 5,479,338 | A | 12/1995 | Ericksen et al. |
| 5,602,728 | A | 2/1997 | Madden et al. |
| 5,813,606 | A | 9/1998 | Ziff |
| 5,821,864 | A | 10/1998 | Knop et al. |
| 5,834,693 | A | 11/1998 | Waddell et al. |
| 5,836,339 | A | 11/1998 | Klever et al. |
| 5,853,122 | A | 12/1998 | Caprio |
| D407,656 | S | 4/1999 | Klever |
| 5,956,248 | A | 9/1999 | Williams et al. |
| 6,016,971 | A | 1/2000 | Welch et al. |
| 6,088,621 | A | 7/2000 | Woytowitz et al. |
| 6,256,191 | B1 | 7/2001 | Curlee |
| 6,298,285 | B1 | 10/2001 | Addink et al. |
| 6,314,340 | B1 | 11/2001 | Mecham et al. |
| 6,401,530 | B1 | 6/2002 | Roman |
| 6,452,499 | B1 | 9/2002 | Runge et al. |
| 6,459,959 | B1 | 10/2002 | Williams et al. |
| 6,570,109 | B2 | 5/2003 | Klinefelter et al. |
| 6,647,319 | B1 | 11/2003 | Goldberg |
| 6,721,630 | B1 | 4/2004 | Woytowitz |
| 6,772,050 | B2 | 8/2004 | Williams et al. |
| 6,823,239 | B2 | 11/2004 | Sieminski |
| 6,892,114 | B1 | 5/2005 | Addink et al. |
| 6,944,523 | B2 | 9/2005 | Addink et al. |
| 6,977,351 | B1 | 12/2005 | Woytowitz |
| 6,996,457 | B2 | 2/2006 | Williams et al. |
| 7,069,115 | B1 | 6/2006 | Woytowitz |
| 7,181,319 | B1 | 2/2007 | Woytowtiz |
| 7,225,058 | B1 | 5/2007 | Porter |
| 7,243,005 | B1 | 7/2007 | Beutler et al. |
| 7,257,465 | B2 | 8/2007 | Perez et al. |
| 2001/0049563 | A1 | 12/2001 | Addink et al. |
| 2003/0093159 | A1 | 5/2003 | Sieminski |
| 2003/0208306 | A1 | 11/2003 | Addink et al. |
| 2005/0038529 | A1 | 2/2005 | Perez et al. |
| 2005/0055106 | A1 | 3/2005 | Buetler et al. |
| 2005/0267641 | A1 | 12/2005 | Nickerson et al. |
| 2005/0273205 | A1 | 12/2005 | Nickerson et al. |
| 2008/0027587 | A1 | 1/2008 | Nickerson et al. |
| 2008/0058964 | A1 | 3/2008 | Nickerson et al. |
| 2008/0071426 | A1 | 3/2008 | Perez et al. |

OTHER PUBLICATIONS

Rain Bird, Components of the Maxicom System, Feb. 9, 1994, p. 3.2, Section 3, US.

Rain Bird, Central Control System, Maxicom—Guide to Operations, Feb. 1993, TOC and pp. 5.4-1-2; 5.4-41-42;7.2-1-2; Rain Bird Sales, Inc., Tucson, AZ.

Rain Bird, Maxicom Guide to Operations, Oct. 1994, Chapter 7, US.

Motorola, MIR5000 Radio Linked Central Irrigation Control System Planner, Mar. 8, 1993, TOC and pp. 1-42, The Toro Company, Riverside, CA.

Motorola, Motorola MIR5000 System Features, Nov. 1991, 20 Pgs., San Diego Turf & Irrigation, San Diego, CA.

Motorola, Motorola MIR-5000 Component Descriptions, Feb. 16, 1993, 5 pgs., Megeath.

Model 39624 Pedestal Mount Field Controller Model 39625 Wall Mount Field Controller, Royal Coach/Buckner Catalog, Jan. 1983, 1 page, Litho, USA.

Modular Solid State Controllers, Buckner Water Management By Design Catalog, May 1990, 8 pages, USA.

Sales Offices and Warehouses, Royal Coach/Buckner Catalog, Jan. 1983, 1 page, Sheet No. 280-286, Litho, USA.

XKit Expander Module Kit (Series 8700), Solatrol Catalog, Feb. 1995, 1 page, Solatrol Inc., USA.

LEIT 8000 Universal Control Unit (LEIT 8000-2), Solatrol Catalog, Feb. 1995, 1 page, Solatrol Inc., USA.

Expanded Light-Energized Installation, LEIT8000 Light Energized Irrigation Technology Control System Catalog, Jan. 1995, 1 page, Solatrol (now DIG Corp.), USA.

Dukes, Michael D. et al., "Residential Irrigation System Rainfall Shutoff Devices," University of Florida IFAS Extension, Aug. 2002, 7 pages.

Trenholm, L.E. et al., "How to Calibrate Your Sprinkler System," University of Florida IFAS Extension, Jan. 2001, 4 pages.

MODULAR IRRIGATION CONTROLLER

CROSS REFERENCE TO RELATED APPLICATIONS

This application claims priority to U.S. Provision Application 60/599,598, entitled *Modular Irrigation Controller*, filed Aug. 6, 2004 the entire contents of which are hereby incorporated by reference.

FIELD OF INVENTION

This invention relates to an irrigation controller for controlling the operation of an irrigation system pursuant to a watering schedule that may be programmed by the user. More particularly, this invention relates to an irrigation controller for controlling multiple irrigation stations.

BACKGROUND OF THE INVENTION

Irrigation systems are commonly used to compensate for inadequate rainfall by artificially watering turf or other landscape. In their most basic form, irrigation systems comprise water supply lines that direct water to a group of sprinklers. Each sprinkler is placed at varying positions around the landscape, preferably maximizing the area on which water is disbursed.

Control of each sprinkler is typically left to valves coupled to the water supply lines, preventing or allowing water to flow to each of the sprinkler heads. In some residential and commercial irrigation systems, electrically controlled solenoid valves are operatively connected to an irrigation controller or central computer. These irrigation controllers include a microprocessor with an input interface (such as a dial and buttons) where a user can program a desired watering schedule. When the watering schedule calls for irrigation of at least a portion of the landscape, the irrigation controller causes one or more solenoid valves to open so that water flows to their respective sprinklers. When the schedule calls for an end to the irrigation, the irrigation controller causes the solenoid valves to close, stopping the water flow to the sprinklers.

Early irrigation controllers included a fixed number of terminals in which to connect the irrigation system's solenoid valves, as seen in U.S. Pat. No. 5,060,859, the contents of which are hereby incorporated by reference. While functional, these early irrigation controllers lacked the flexibility to connect and control additional valves. Unfortunately, if a user wished to expand their irrigation system, it required either a new irrigation controller with a greater number of valve terminals or the use of multiple irrigation controllers or a second smaller station count controller.

In an effort to increase the flexibility of irrigation controllers, the modular irrigation controller was invented to easily increase the number of sprinklers that can be added to an irrigation system, as seen in U.S. Pat. Nos. 5,956,248; 6,459,959; 6,772,050, the contents of which are hereby incorporated by reference. In a modular irrigation controller, multiple valve leads or irrigation station leads are connected to small modules that removably connect to the controller. Additional station output modules can later be added or removed from the controller as needed.

Prior art modular controllers, however, have numerous drawbacks. For example, older prior art modular controllers typically include modules with a set number of irrigation station terminals. Newer prior art modular controllers increase the number of terminals, but require additional footprint space (e.g., a 4 terminal module may be replaced with a 9 terminal module but requires two module slots.

These prior art modular controllers typically require the modules to be inserted into the controller slots in a specific position order. Further, present day controllers typically do not retain programming information for a module slot after the module is removed.

While sensors such as soil or flow sensors may be added to the prior art modular controllers, these arrangements typically required a separate printed circuit board (PCB) with its own terminal block. These sensors were not in the form of the standard modules and so required mounting and sometimes complicated connections. Further, flow meters required that prior art controllers have some form of two-way communication to read and respond to the flow meter data. Since most prior art controllers lacked such two way communication, personal computers were typically required for such functionality. Typically, controllers on the market with flow sensing capability are considerably more expensive.

In another example, prior art modular controllers are typically produced in either indoor or outdoor models. Outdoor controller models mount a power transformer within the controller housing and must comply with more stringent flame rating guidelines for the entire controller housing materials. By contrast, indoor controller models typically use an external AC wall adapter transformer which has fewer regulation requirements and therefore are significantly less expensive to purchase and implement than external models. Since two distinct irrigation controllers must be used (one indoor and one outdoor) the additional expense of designing and producing two different irrigation controllers is incurred and ultimately passed on to the consumer in the controller purchase price.

What is needed is a modular controller that overcomes the limitations of the prior art. More particularly, a modular controller is needed that can utilize modules with various numbers of irrigation terminals, yet maintain a single slot footprint. A modular controller is also needed that can maximize slot usage by sensor modules, save module programming, and decrease the cost associated with producing both an outdoor and indoor model.

BRIEF SUMMARY OF THE INVENTION

It is an object of the present invention to overcome the limitations of the prior art.

It is another object of the present invention to provide a controller module with various numbers of irrigation station terminals within a standard module footprint size.

It is yet another object of the present invention to provide a controller module with both sensor terminals and irrigation station terminals.

It is yet a further object of the present invention to provide an irrigation controller that can recognize a controller module connected at any module slot.

It is a further object of the present invention to provide an irrigation controller that easily converts to and from an indoor and outdoor model.

In one preferred embodiment, the present invention attempts to achieve these objects by providing a modular controller that connects to irrigation modules with varying station terminals and a standard footprint size. Additionally, the modular controller includes surge protection options, wireless communication with PDA's and other external devices, no required position for each controller module to be connected, immediate display of station modules on the LCD display, retention of a water program if module is removed, communications module for flow monitoring, a modular transformer, rain sensor receiver within the housing, an improved 9-volt battery holder, and other aspects described in the present application.

DETAILED DESCRIPTION OF THE INVENTION

Figure 1:
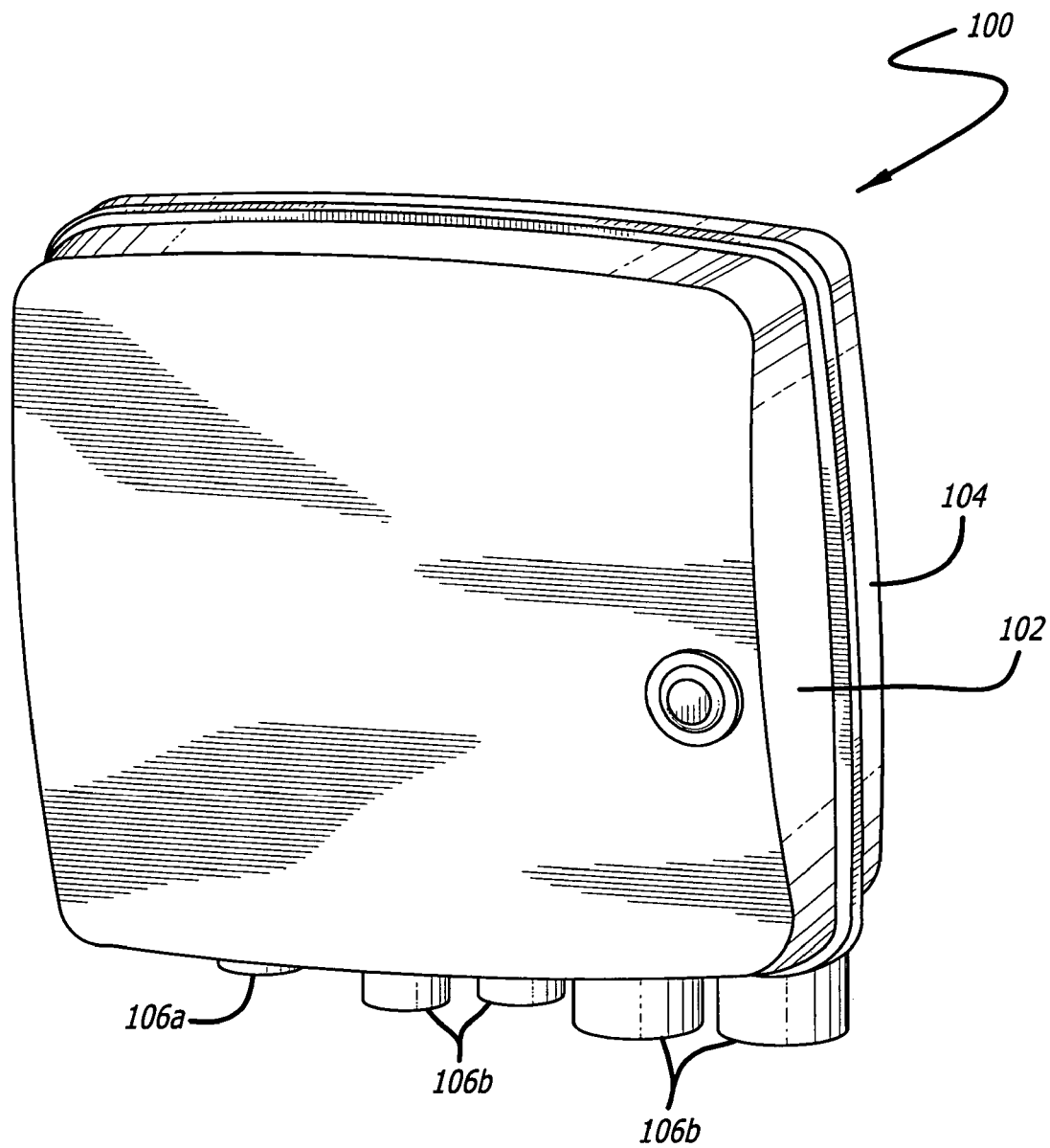
FIG. 1 illustrates a front view of a modular controller according to the present invention.
Figure 2:
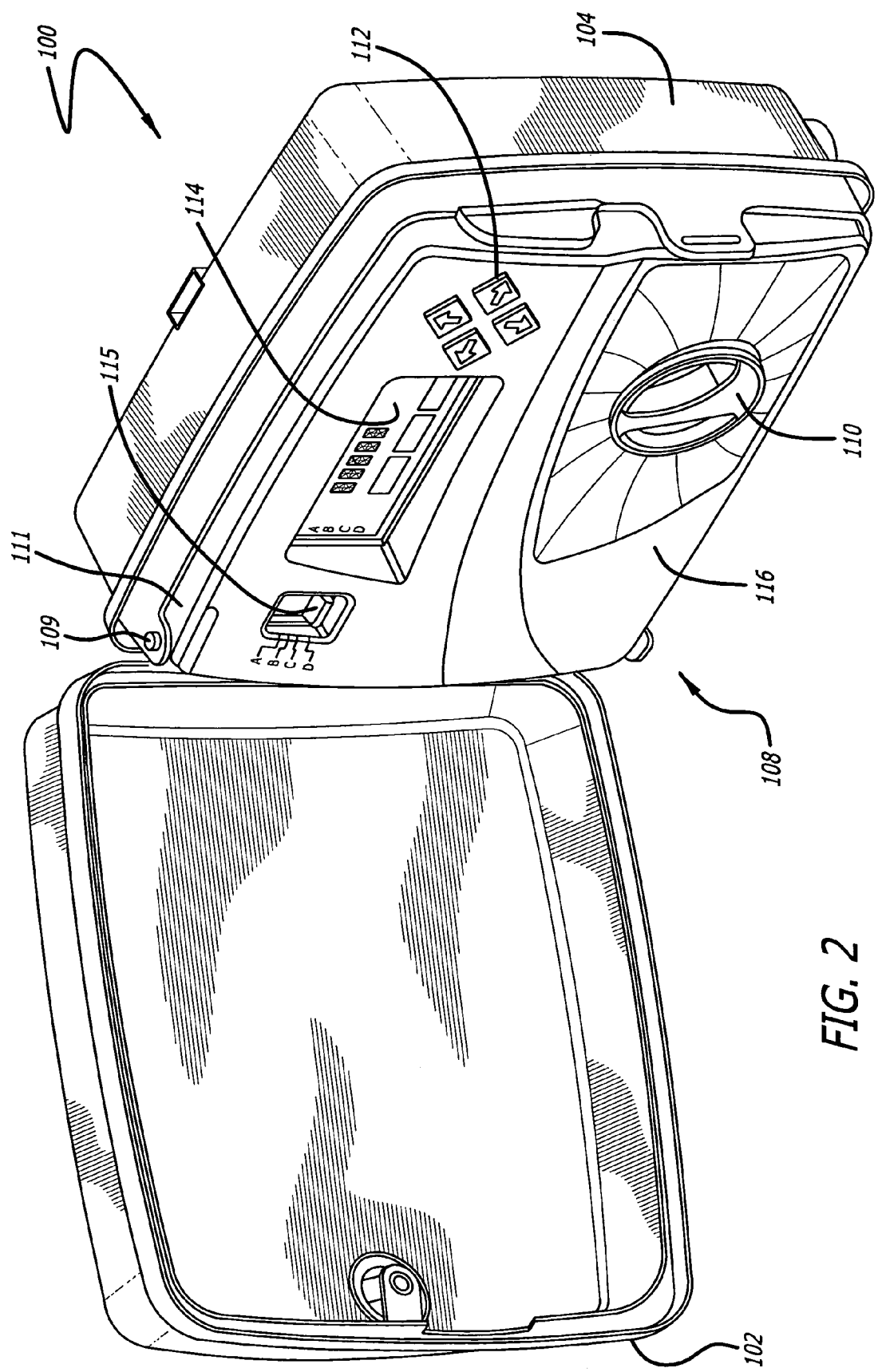
FIG. 2 illustrates a perspective view of the modular controller of FIG. 1.

FIGS. 1 and 2 illustrate a preferred embodiment of a modular controller 100 for an irrigation system according to the present invention. The modular controller 100 includes a rear housing 104 that contains and protects the controller 100 components. A front cover 102 is attached to the rear housing 104 by a hinge (not shown) which allows the front cover 102 to swing open and closed over a controller console 108.

The console 108 provides a mechanism for a user to input irrigation scheduling data into the modular controller 100 via the dial 110, arrow buttons 112 and switch 115 while relevant schedule programming data is displayed to the user by display 114. As seen best in FIGS. 2 and 3, the dial 110, buttons 112, and switch 115 are positioned through a faceplate 116 that preferably includes indicia to assist a user in adjusting and programming a watering schedule.

Note that the console 108 is preferably designed to be removable from the rest of the modular controller 100, allowing remote schedule programming. To this end, a biased hinge arm 111 is positioned to engage the top hinge hole 109. To remove the console 108, the user simply depresses the biased hinge arm 111 towards the console 108 which removes the biased hinge arm 111 from the top hinge aperture 109 and a bottom aperture 182 (best seen in FIGS. 4 and 5). Finally, a communications cable (not shown) linking the console 108 to other modular controller components is removed from the console 108, leaving the user free to program the console 108 at any location.

As best seen in FIGS. 4, 18A-18C, and 19A-19C, the rear housing 104 includes a lowered edge 180 (i.e. an edge 180 with a reduced height) along the side of the housing 104 between the top hinge aperture 109 and the bottom hinge aperture 182 which allows the console 108 to open to an angle greater than 90 degrees. Without this lowered edge 180, the thickness of the console 108 would otherwise contact the rear housing 104 at a smaller angle, reducing the amount the console 108 could open and thereby decreasing the accessibility of the interior to a user.

The lowered edge 180 includes a generally flat region 180B at the lowest height and two curved or contoured regions 180A on either side of the flat region 180B. As seen in FIG. 19A, the flat region 180B provides an absolute stopping point at which the console 108 contacts and is prevented from opening further. The contoured regions 180A are shaped to contact a portion of an edge 108A of the console 108 at a predetermined angle, therefore providing resistance for the console 108 when opened to that specific angle. Preferably, this angle of resistance or detent angle is just prior to the fully opened position of the console 108. Therefore, the console 108 swings freely until it encounters the detent angle, at which point more force is required to overcome the detent. Once past the detent, the console 108 tends to stay in the fully opened position, preventing light forces such as a gust of wind from closing it.

Figure 18B:
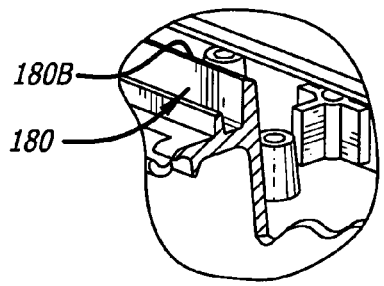
FIGS. 18A-19C illustrate side perspective views of a modular controller that includes a swinging hinge assembly according to the present invention.
Figure 18C:
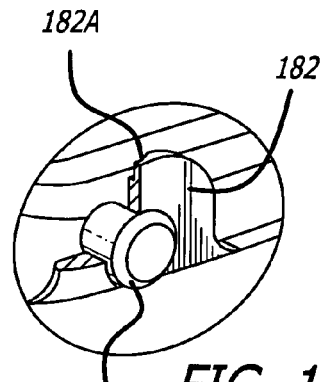
Figure 18A:
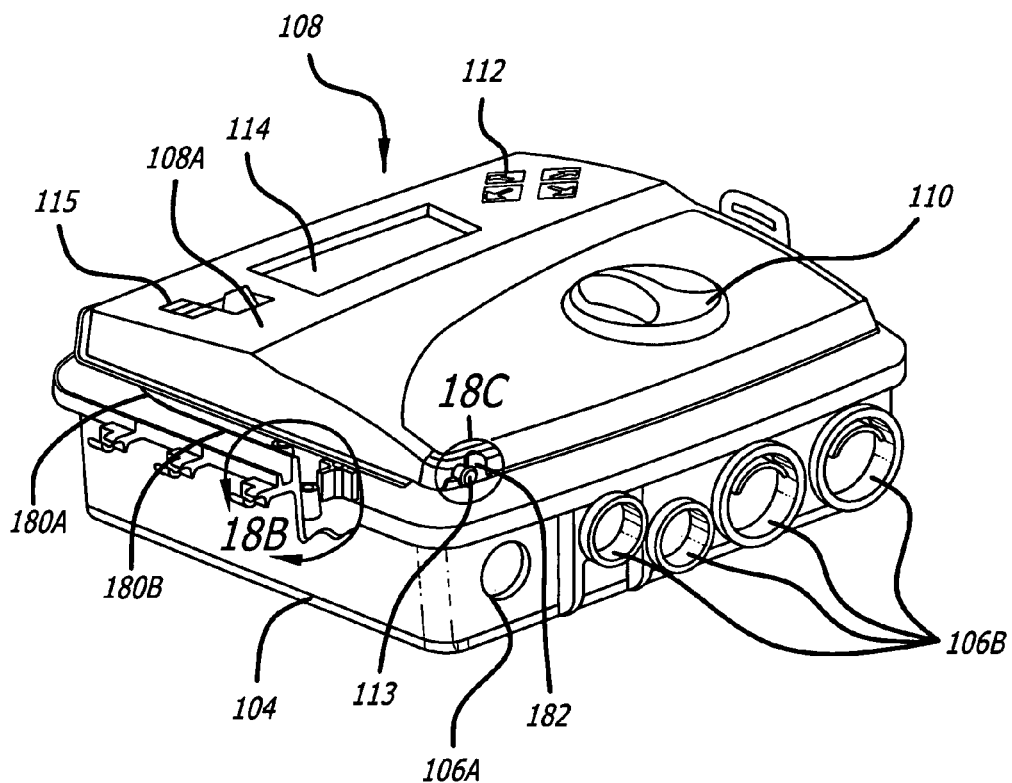
Figure 19B:
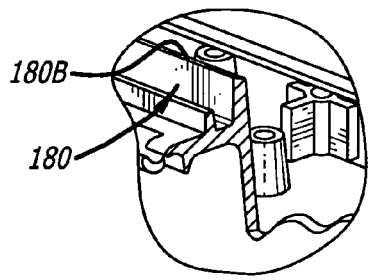
Figure 19C:
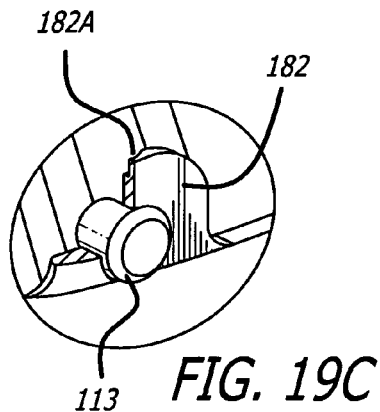
Figure 19A:
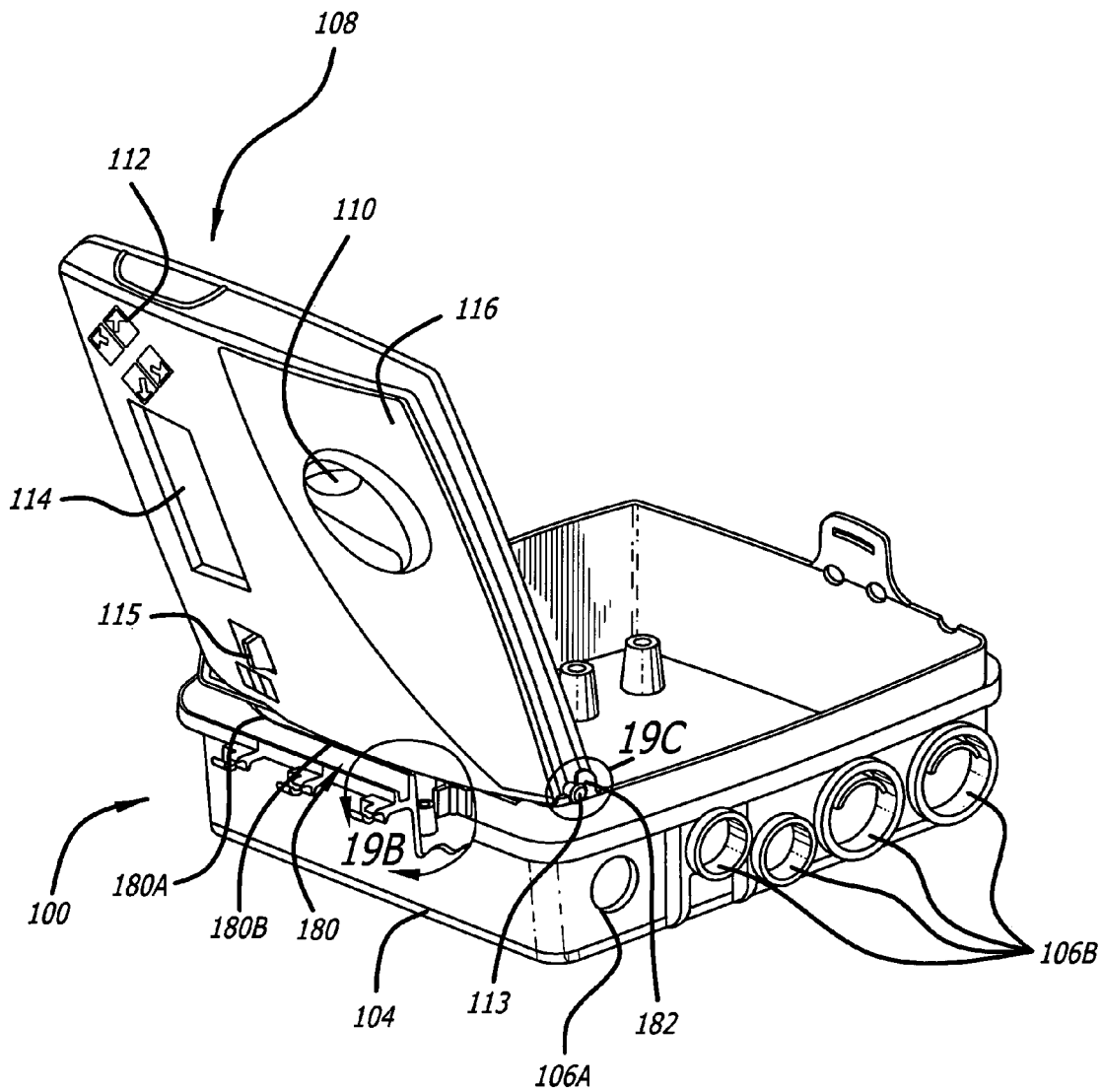

Additionally, as seen best in FIGS. 18C and 19C, the region of the rear housing 104 near the bottom hinge aperture 182 may include a small depression 182A or alternately a small raised portion on the surface contacting the console 108. This small depression 182A is positioned to create additional force coinciding with the previously discussed contoured regions 180A on the console 108, thereby increasing the force needed to overcome the detent.

Note that both the contoured surfaces 180A and the depression 182A may be shaped and positioned to create more contact and/or pressure with the console 108 to increase the detent force, while reducing the contact and/or pressure with the console 108 may decrease the detent force. Additional sizing and shaping are also possible to adjust the "feel" of the detent to a user.

Figure 3:
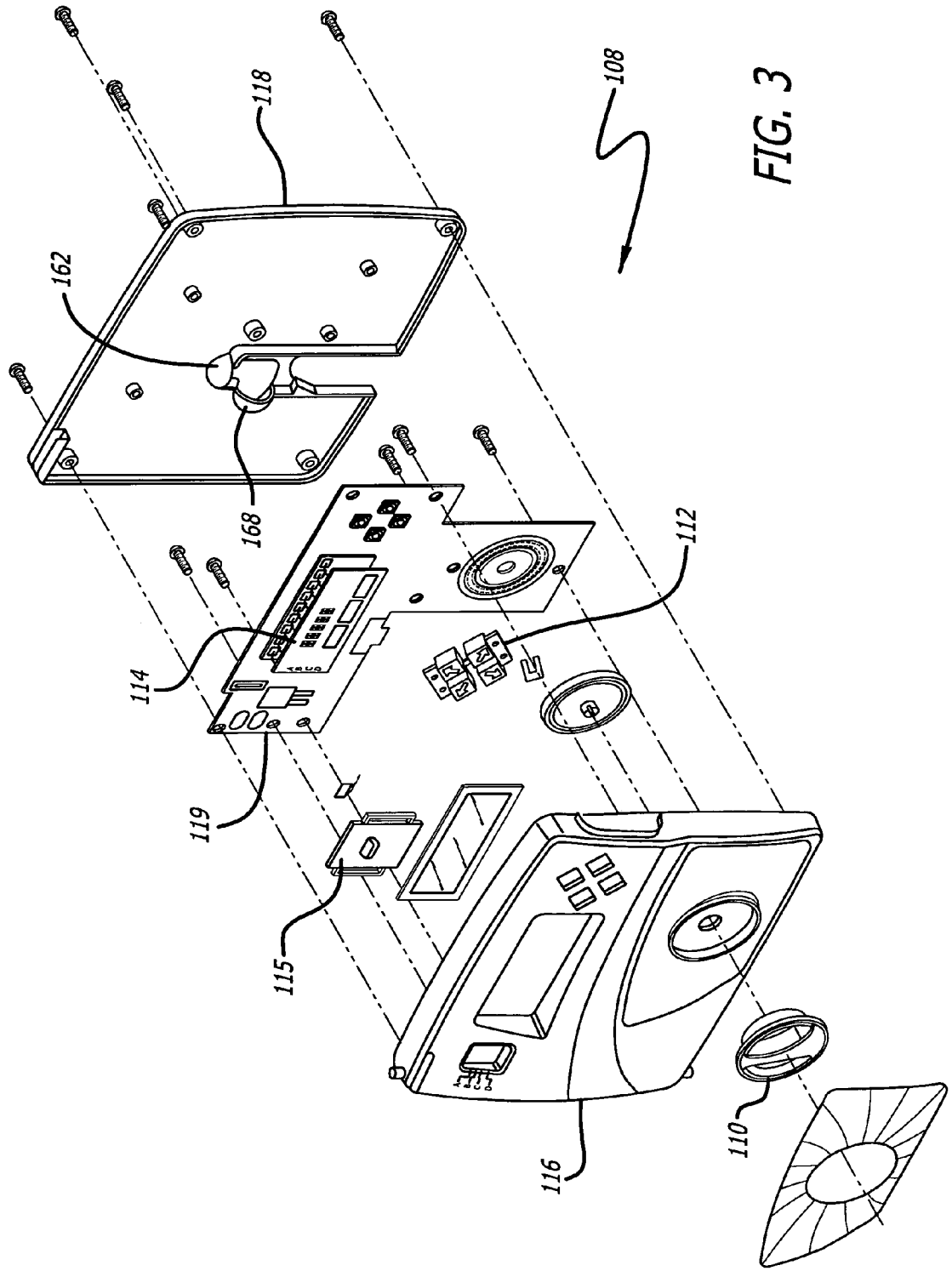
FIG. 3 illustrates an exploded view of a console according to the present invention.

Turning to FIG. 3, an exploded view of the console 108 illustrates a front console panel 116 and a rear console panel 118 which enclose a circuit board 119. The circuit board 119 connects to the input devices such as the dial 110, buttons 112, and switch 115, routing electrical signals to an onboard microprocessor (not shown). Display 114 is also connected to the circuit board 119, presenting the user with relevant status and programming information.

Figure 4:
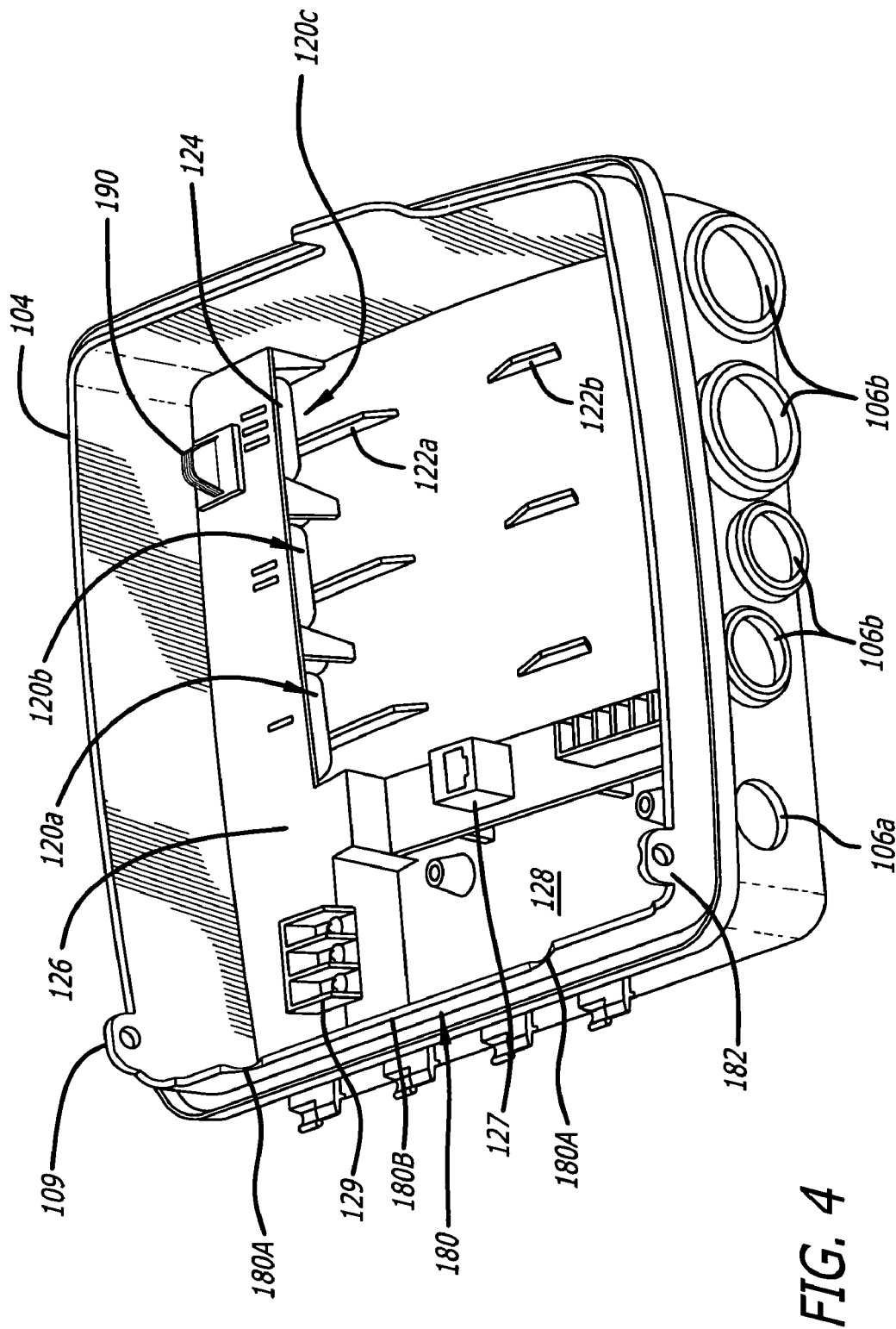
FIG. 4 illustrates an interior perspective view of a rear housing according to the present invention.

FIG. 4 illustrates a preferred embodiment of the rear housing 104 according to the present invention which includes three irrigation module slots 120. Each slot 120 allows an irrigation module to be inserted and thus electrically connected to the modular controller 100, as is discussed in greater detail later in this application. Wires, for use with power or irrigation stations for example, are positioned through wire ports 106a and 106b at the lower end of the rear housing 104, allowing for convenient access to the interior of the modular controller 100.

Modular Transformer

Present irrigation controllers are typically produced in either indoor or outdoor models. Outdoor controller models mount the power transformer within the controller housing and must comply with a more stringent class of flame rating guidelines of the Underwriters Laboratories Inc. (UL), namely Class 2 or UL1585. For example, outdoor models require tab or end-bell type transformers, as well as some type of protected terminal block to avoid shorts across the power leads or electric shock to a user. Further, the transformer and terminal block must be enclosed with a protective housing that must be flame rated to meet UL standards UL94, 5VA, and UL746C.

By contrast, indoor controller models typically use an external AC wall adapter transformer which is classified as a self-limiting class 2 transformer and therefore does not fall under the UL guidelines. Thus, the indoor transformer models have fewer requirements and therefore are generally significantly less expensive to purchase and implement when compared to external models.

Since two distinct irrigation controllers must be used (one indoor and one outdoor) the additional expense of designing and producing two different irrigation controllers is incurred and ultimately passed on to the consumer in the controller purchase price. If a user wishes to move an indoor modular controller to an outdoor location, a new outdoor modular controller must be purchased. One preferred embodiment of the present invention eliminates these problems by providing a single irrigation controller designed to accommodate a modular transformer.

Figure 5:
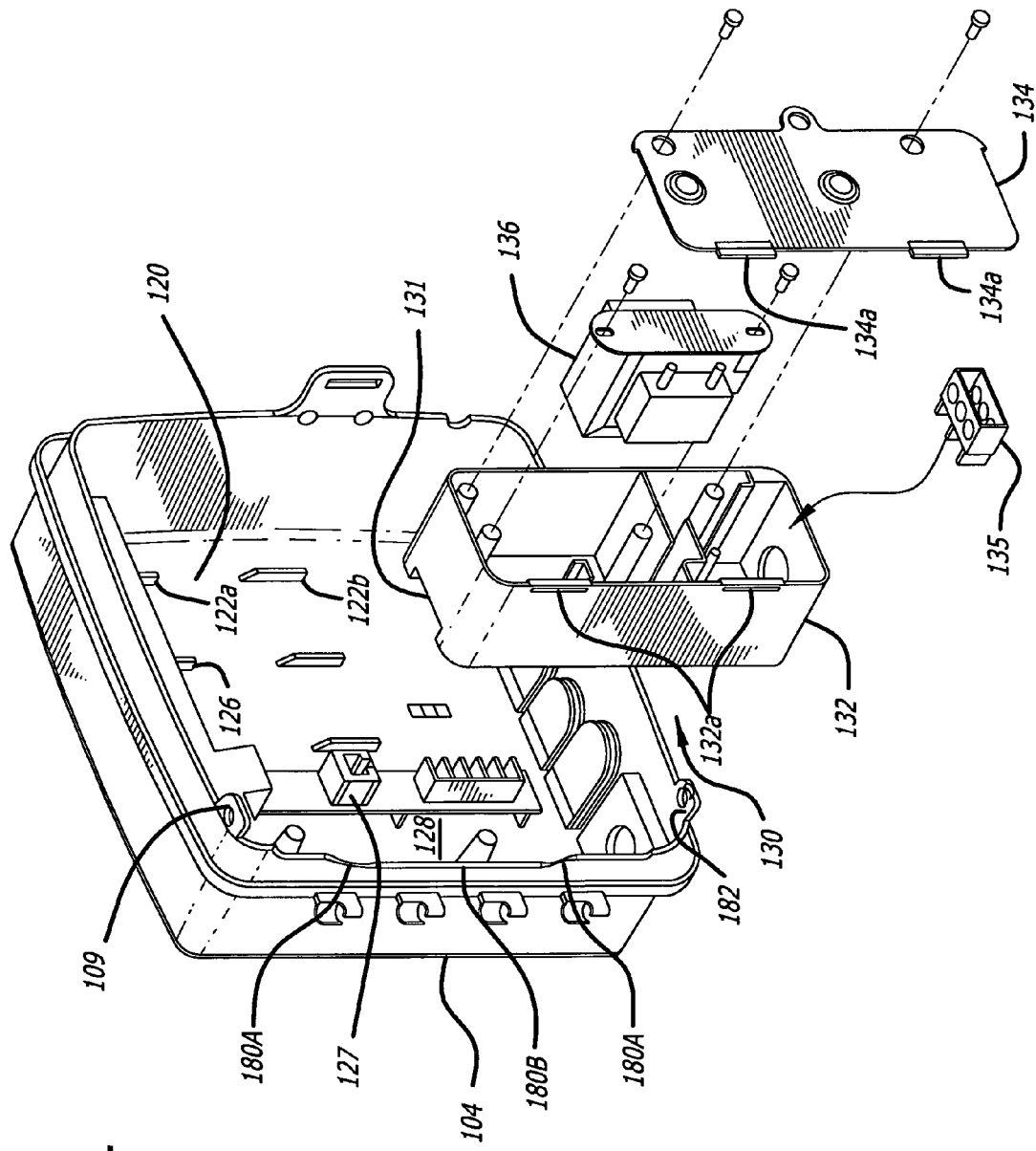
FIG. 5 illustrates an interior perspective view of the rear housing of FIG. 4 with a modular power supply.
Figure 6:
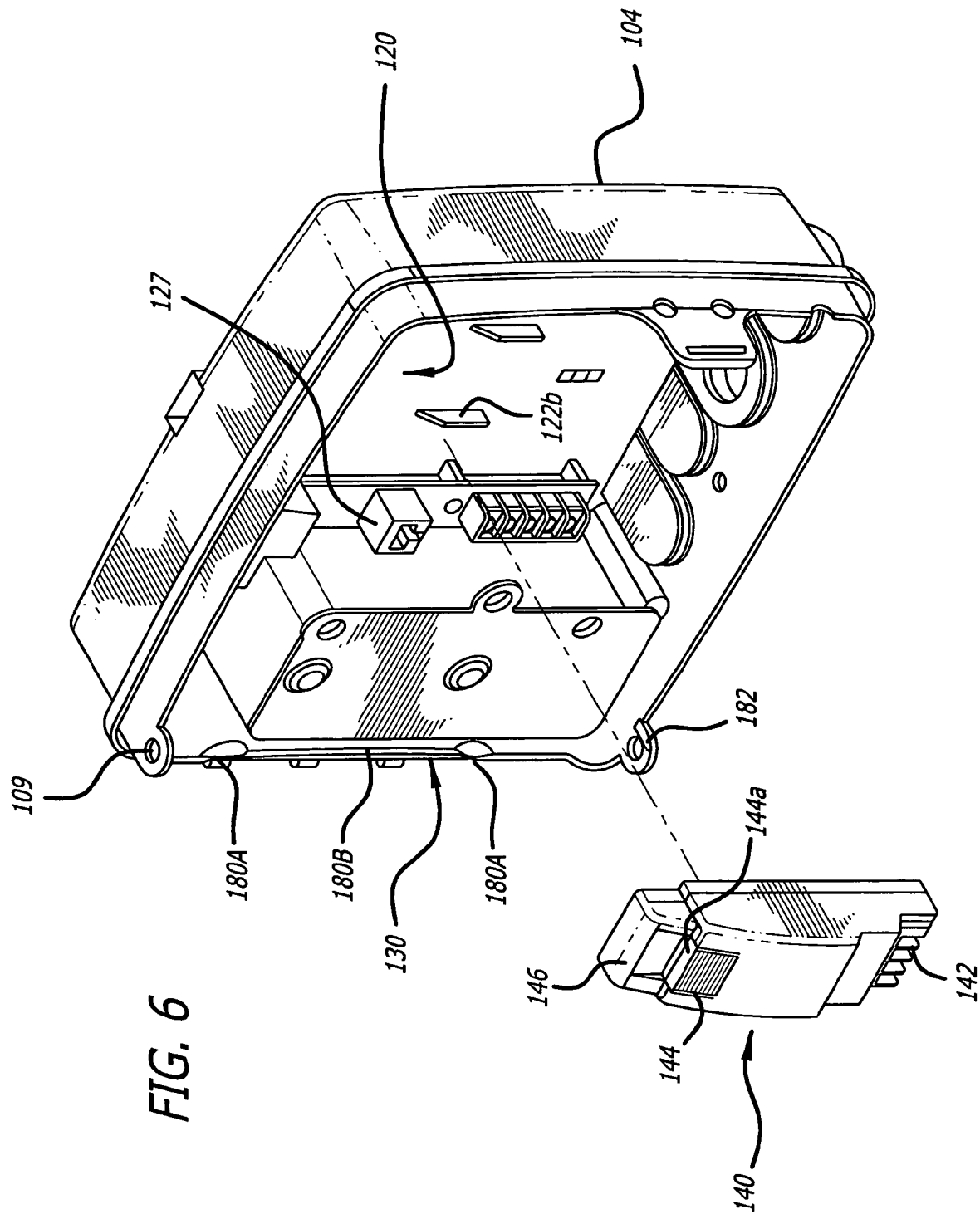
FIG. 6 illustrates an interior perspective view of the rear housing of FIG. 4 with a station output module.

Turning to FIGS. 4-6, the inside layout of rear housing 104 is illustrated according to the present invention, including a modular transformer footprint 128 and a controller power terminal 129. In the case of an irrigation controller 100 for indoor use, a standard transformer (not shown) may be mounted externally to the controller 100. The transformer wires may be fed through wire port 106*a* and connected to the controller power terminal 129, allowing the power requirements of the controller 100 to be safely satisfied in any indoor setting.

FIG. 5 illustrates an exploded view of the modular transformer assembly 130 which is sized and shaped to fit within the modular transformer footprint 128. The modular transformer assembly 130 includes a transformer 136, preferably either a tab mounted or end-bell design, and a terminal block 135 mounted within a transformer housing 132. The lead wires (not shown) of the transformer 136 exit the transformer housing 132 through a top aperture 131 to connect to the controller power terminal 129. The modular transformer assembly 130 can be accessed by a removable cover 134 that fastens to the housing 132 by way of a tab 134*a* and slot 132*a* arrangement, as well as by screws. The modular transformer assembly 130 may be secured within the footprint 128 by additional mounting screws.

In this respect, the modular transformer assembly 130 may be added to the modular controller 100 for an outdoor model or replaced with an external transformer for an indoor model. Thus, the costs associated with design and production of the modular controller 100 is reduced while distributors, contractors, and users may easily change existing configured modular controllers 100.

Additional Station Counts Within Module Footprint

Unlike prior art modular controllers that only allow a fixed number of irrigation station terminals on each station module, the modular controller 100 accommodates station modules with additional input terminals within the same module footprint. These additional terminals may communicate with an irrigation station or with various sensors, for example rain sensors, flow meters, and soil moisture sensors. Thus, the modular controller 100 has greater flexibility with larger irrigation systems, yet does not require additional space within the modular controller 100.

Figure 8:
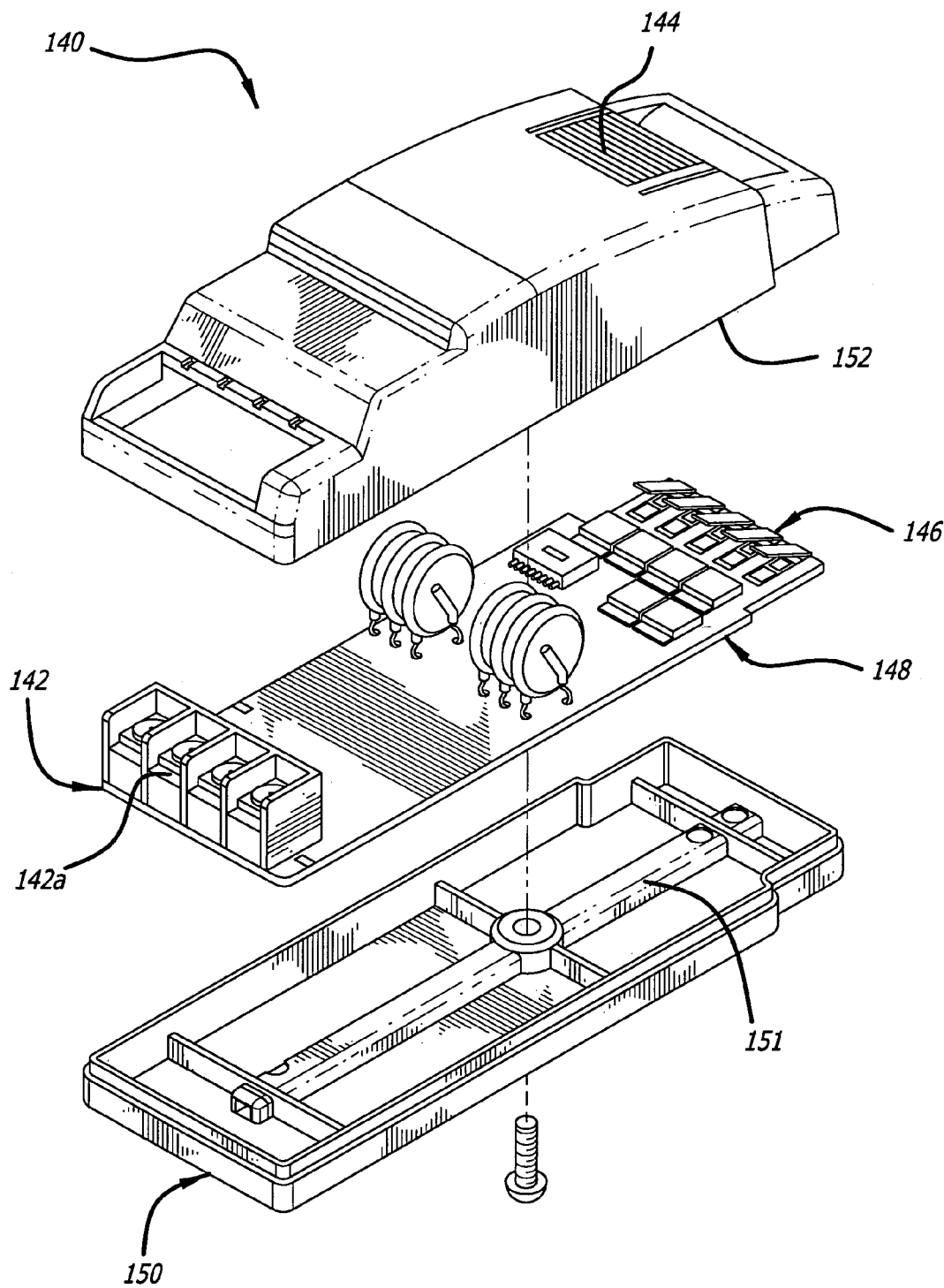
FIG. 8 illustrates an exploded view of an irrigation station module according to the present invention.

FIG. 8 illustrates an exploded view of a basic irrigation module 140 according to the present invention. The main functionality of the basic irrigation module 140 is provided by the circuits and electrical switches of circuit board 148. Typically, the circuit board 148 includes a programmed microcontroller that can be reprogrammed with the flash technology commonly known in the art. The circuit board 148 also includes resistors for determining the number of irrigation stations connected to the module 140.

The modular controller 100 communicates with the circuit board 148 via electrical contacts 146. Preferably, these contacts 146 are spring biased conducting tabs, however any electrical contact arrangement that can be removably contacted may be used. More specifically, the modular controller 100 communicates by a $I^2C$ protocol, as is known in the art, via its own individual communication bus. By providing individual communication buses for each module, the modular controller 100 prevents faulty or malfunctioning modules 140 from interrupting communications by other modules. Additionally, checksum bytes are used in these communications to ensure that each message is received and understood properly. As yet a further functional safeguard, commands that require a station to turn on or off are issued twice.

The circuit board 148 also includes an irrigation station terminal bank 142, preferably having a screw-in or snap-in mechanism for each terminal 142*a*, securing leads from the irrigation stations. Typically, multiple irrigation stations are arranged to have one common power wire (not shown) connecting to a single terminal on the modular controller and an independent wire (not shown) that is connected to one of the positions on the irrigation station terminal 142. This arrangement minimizes the number of terminals 142*a* required for an irrigation system since only one wire per irrigation system need be connected to an irrigation station terminal 142*a*. Optionally, each module may include its own common power terminal to reduce installation difficulties possible when connecting multiple common lines to a single common power terminal.

The circuit board 148 is enclosed by an upper cover 152 and lower cover 150. The lower cover 150 includes an alignment groove 151 positioned along the axis of the basic irrigation module 140 to engage alignment ridges 122*a* and 122*b* on the rear housing 104. The upper cover 152 includes apertures allowing the terminal bank 142 and electrical contacts 146 to be exposed. Additionally, the upper cover 152 includes a spring-biased latch 144 with an engagement lip 144*a* that locks under a retaining lip (not shown) underneath a terminal housing 126.

Figure 7:
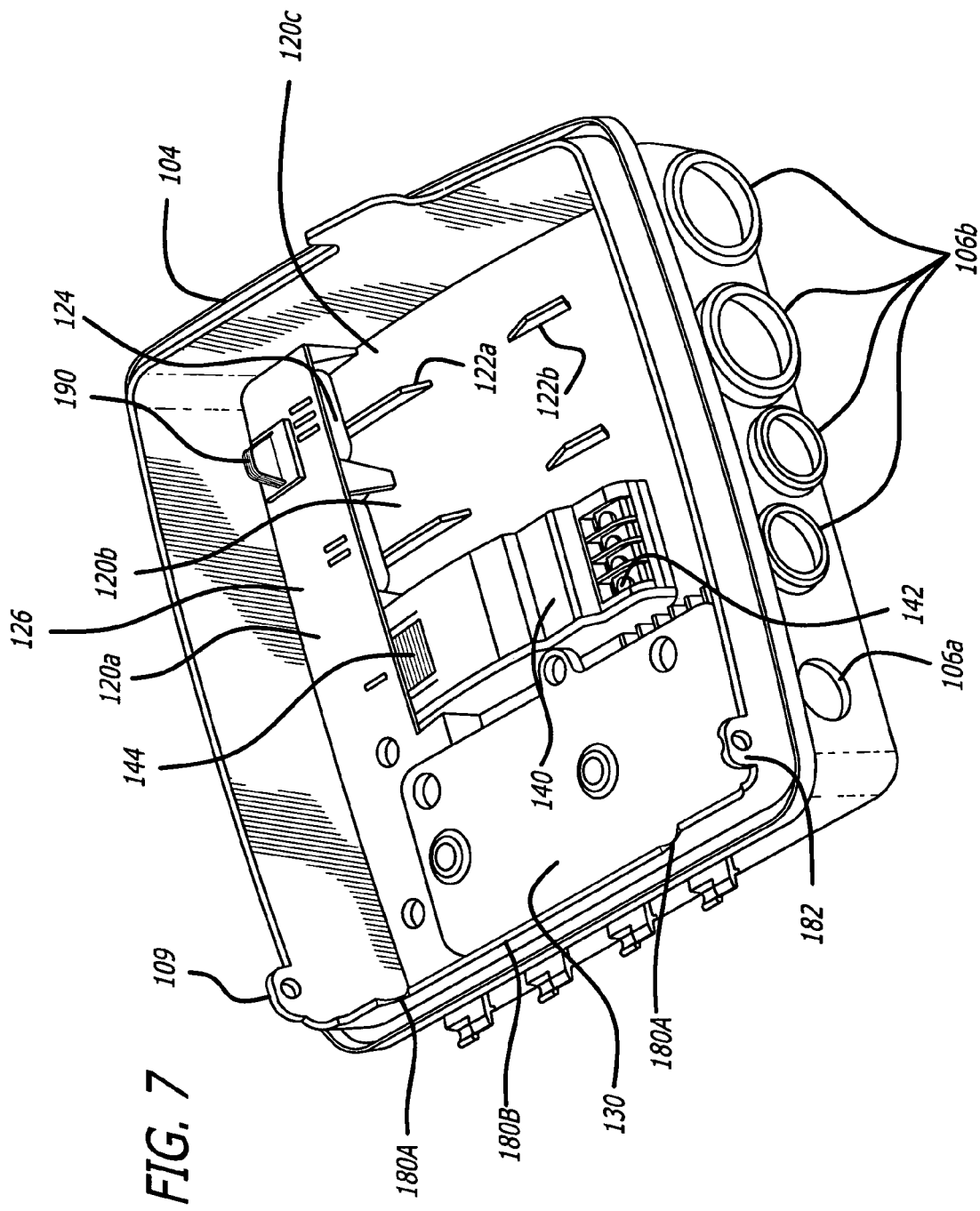
FIG. 7 illustrates an interior perspective view of the rear housing of FIG. 4 with a station output module.

As seen in FIGS. 6 and 7, the basic irrigation module 140 is connected to the irrigation controller 100 by first positioning the irrigation module 140 and specifically the alignment groove 151 over the alignment ridges 122*a* and 122*b*. This ridge-groove arrangement aligns the irrigation module 140 to a desired orientation while allowing axial sliding. Next, the irrigation module 140 is urged towards terminal housing 126, causing the electrical contacts 146 to press against the module terminal 124 and the spring-biased latch 144 to engage the unseen retaining lip. Once in place, the basic irrigation module 140 may communicate with the modular controller 100 in real time.

To remove the basic irrigation module 140, a user simply presses on the spring-biased latch 144 to disengage the engagement lip 144*a* with the retaining lip. This leaves the module 140 free to be removed from the controller 100.

Figure 9:
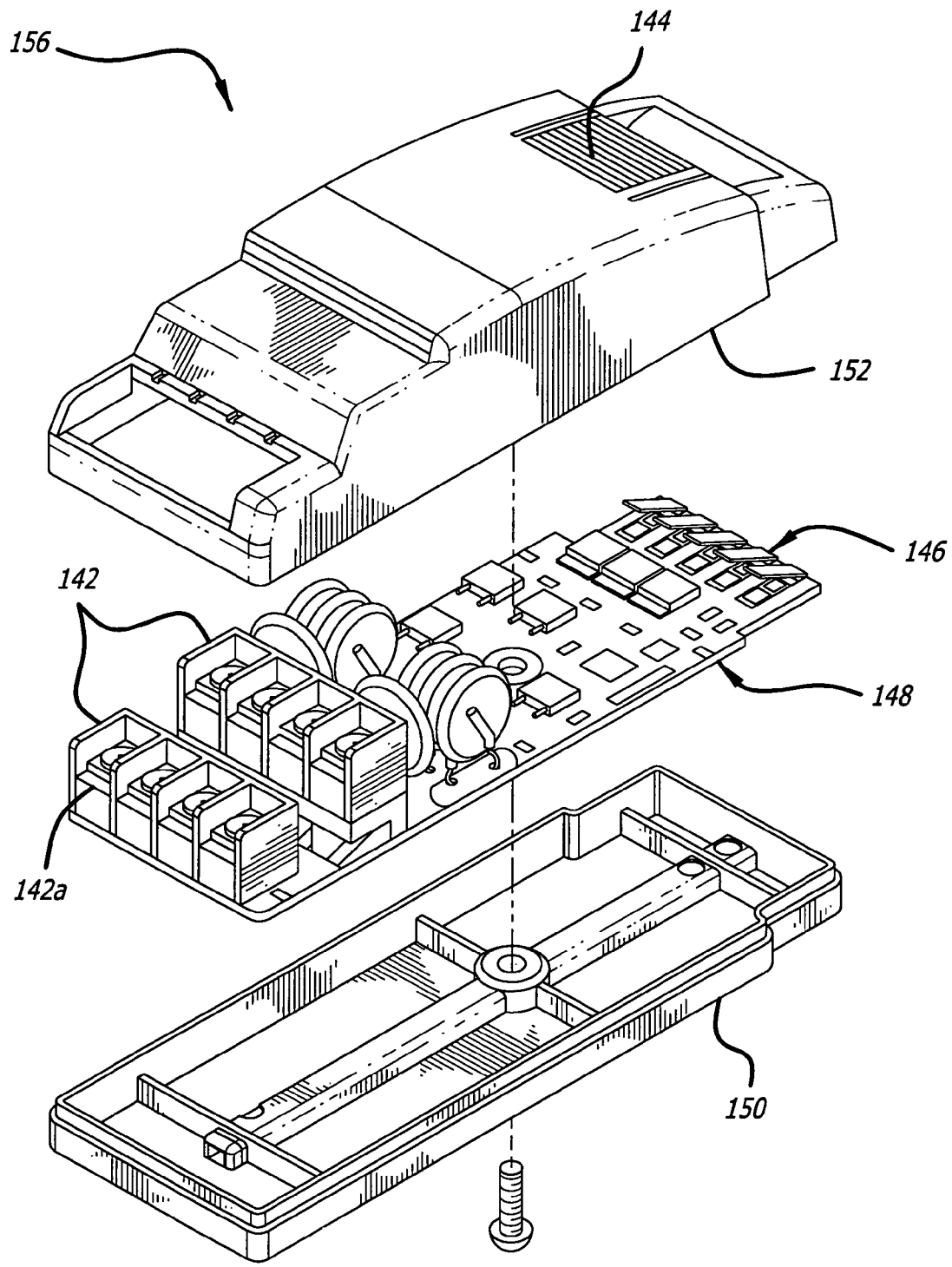
FIG. 9 illustrates an exploded view of an irrigation module according to the present invention an irrigation station output module with additional station counts.

Turning to FIG. 9, a second preferred embodiment of an expanded irrigation module 152 is illustrated according to the present invention. This controller 152 is similar to the previously described basic irrigation controller 140, except for the addition of a second terminal bank 142 with four additional terminals 142*a* and accompanying circuits on the circuit board 148 for controlling each terminal 142*a*. The additional terminal bank 142 is preferably positioned behind and above the first terminal bank 142, with a slight offset to reduce physical interference between irrigation station wires connected to each terminal 142*a*. Thus, additional terminals 142*a* are added to the module 152 without increasing the size or footprint of the module 152.

Figure 10:
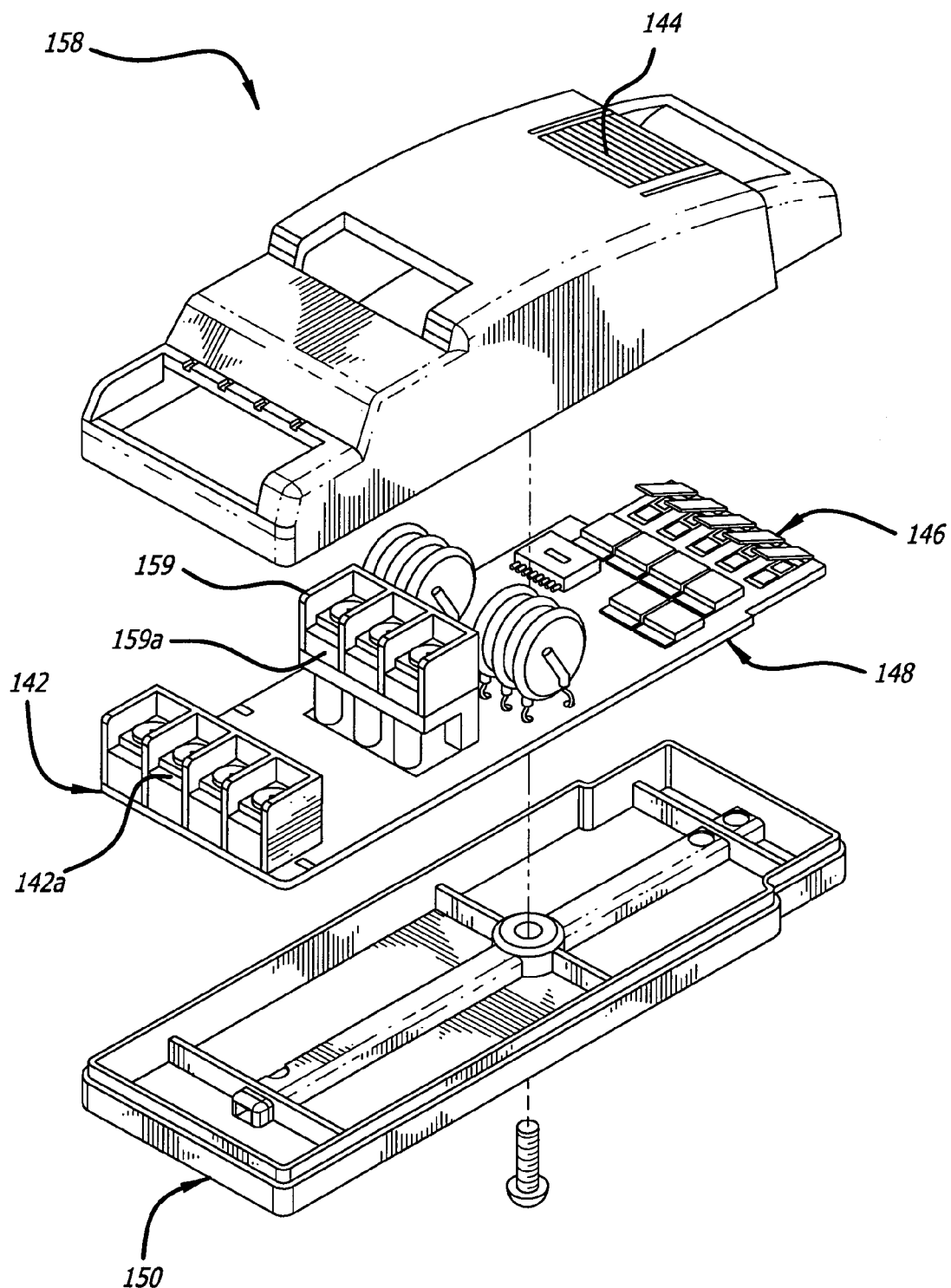
FIG. 10 illustrates an exploded view of an irrigation station module according to the present invention with flow sensing functionality.

FIG. 10 illustrates another preferred embodiment of a sensor irrigation module 158 according to the present invention. Prior art modular controllers typically included sensor terminals on separate printed circuit boards (PCB) which are treated as inputs that are separate from station outputs. Thus, the user was required to use a limited number of sensor input positions, typically one, for printed circuit boards. In this respect, the use of a sensor module was limited by the availability of an input on the sensor module. The present sensor irrigation module 158 overcomes this problem by integrating both sensor terminals 159*a* and irrigation terminals 142*a* into one module with a standard footprint size. Further, the present sensor irrigation module 158 allows multiple sensors to be connected and read by the controller 100, for example 3, greatly expanding the possible sensor functionality that the controller 100 can provide.

This sensor irrigation module 158 has an overall similar structure as the basic irrigation module 140, except for a sensor terminal bank 159 having sensor terminals 159*a*. The sensor terminal bank 159 is connected to the circuit board 148 and communicates with the modular controller 100 through electrical contacts 146. A sensor, such as a flow meter or soil moisture sensor may be connected to the sensor terminal bank 158, providing the modular controller 100 with sensor information to influence the irrigation schedule. By including the sensor terminal bank 159 with the irrigation terminal bank 142 on the controller 158, additional sensors can be easily connected to the modular controller 100 without sacrificing control of additional irrigation stations. Further, by locating the sensor terminal block on a module, a user can purchase sensor inputs only if they are needed. Thus, the present invention provides a variable number of sensor inputs which provides the user with cost efficient flexibility not provided with the fixed sensor inputs of prior art controllers.

Optionally, the sensor irrigation module 158 may include a wireless transmitter/receiver (not shown) for downloading data from a PDA or other wirelessly enabled device. Preferably, such a transmitter/receiver is achieved with radio frequencies, e.g. WiFi, or infrared frequencies. Ultimately, such wireless communications allow the user to program more intricate sensor monitoring by the modular controller 100. For example, this more complex monitoring may be particularly useful when monitoring flow, due to the need for multiple flow thresholds at various times during a watering cycle.

Figure 11:
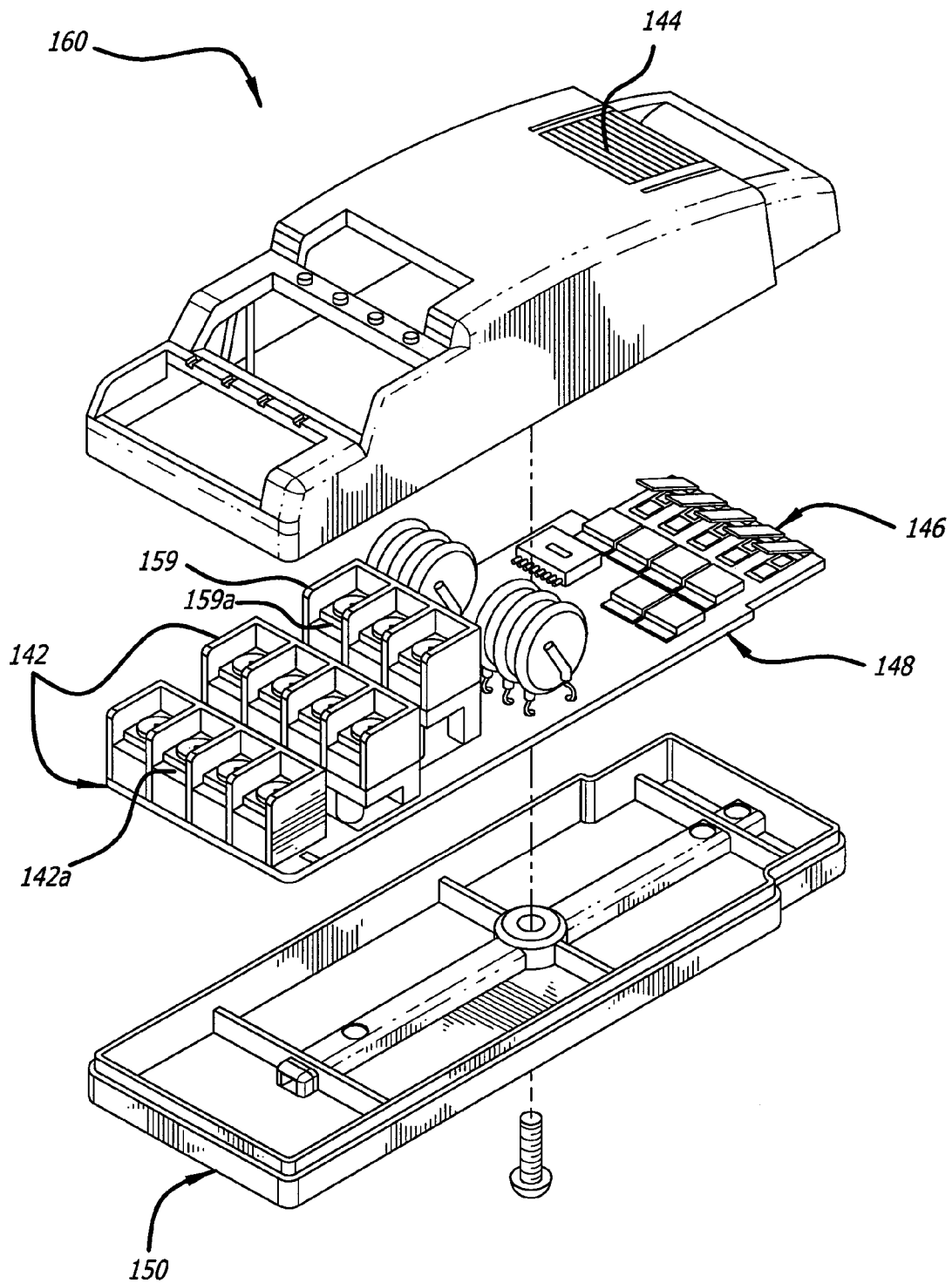
FIG. 11 illustrates an exploded view of an irrigation station module according to the present invention with flow sensing functionality.

FIG. 11 shows a hybrid design of the previous two modules 152 and 158 according to the present invention. A combination irrigation module 160 includes two irrigation terminal banks 142 and a sensor terminal bank 159, providing double the number of terminals 142*a*, as well as modular sensor capability. This design offers even more flexibility by including sensor functionality without sacrificing control of additional irrigation stations.

Preferably, the modules of the modular controller 100 may include a communication feature which allows multiple modular controllers to manage the same flow meters simultaneously. This allows the controllers to address the various site conditions with the use of only one flow meter.

In addition to providing modules with different numbers of irrigation terminal banks 142 and sensor terminal banks 159, the modular controller 100 may include distinguishing indicators such as different color modules and icons to assist a user in easily distinguishing module features. For example, the color of the modules may be changed to reflect different levels of surge protection and sensor functionality. In a more specific example, a grey module may indicate standard surge protection within the module, a beige module may indicate high surge protection, Blue may indicate a high surge protection with a flow monitoring sensor, and red may indicate high surge protection with communication functionality to allow multiple controllers 100 to manage one flow meter.

Figure 14:
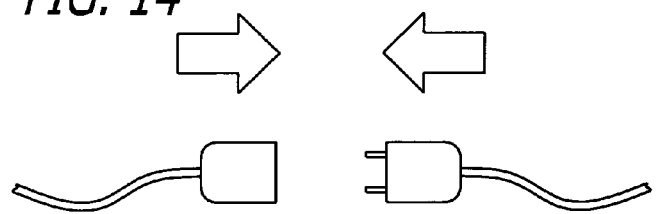
FIGS. 14-17 illustrate various icons according to the present invention.
Figure 15:
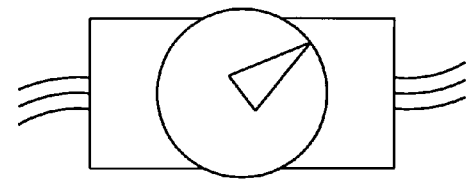
Figure 16:
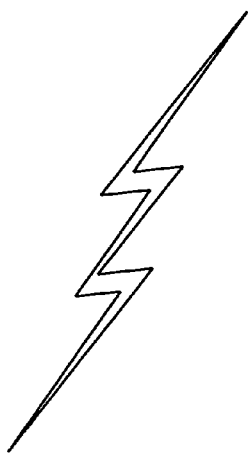
Figure 17:
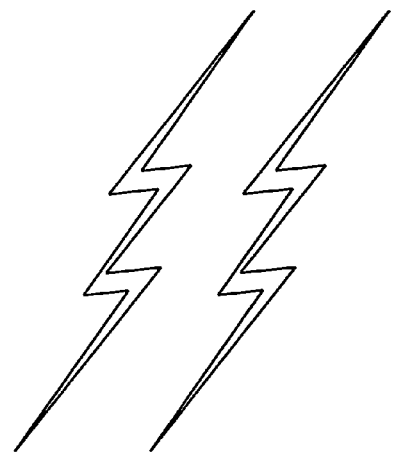

In another example, module functionality may be distinguished by icons on the modules or on the display 114 of the controller 100. For example, FIG. 14 may indicate communication functionality to allow multiple controllers 100 to manage the same flow meters, FIG. 15 may indicate flow monitoring ability, FIG. 16 may indicate standard surge protection, while FIG. 17 may indicate a high level of surge protection.

Further, the modules may combine color and icons together to provide duplicate description of a module or simply additional feature distinction. Thus, a user may easily determine the functionality of a module with a brief visual inspection.

Modular Surge Protection

The modular controller 100 also preferably includes a modular surge controller. Modules with no surge protection typically rely on the triac to absorb any electrical surges that may be discharged to their electrical system from, for example, lightning or other sources of stray voltage. However, modules with surge protection are able to withstand greater amounts of electrical surges, therefore reducing the risk of damage to the modules. Preferably, metal oxide varisters (MOV's) are used for increased surge protection within the modules, allowing the modules to maintain its size, with or without the increased surge protection. In this respect, the added surge protecting functionality does not sacrifice increased size of the modules.

Preferably, the presence of a module with surge protection is communicated to the modular controller 100 and displayed on the display 114.

Microprocessor Functionality

As previously described, the modular controller 100 includes a microprocessor (not shown) and related components such as memory. The microprocessor of the present invention not only allows the user to program an irrigation schedule for an irrigation system but also allows enhanced controller features such as random module insertion order, immediate display of station module on the display 114, and program retention if module is removed.

Prior art modular controllers require that irrigation modules be inserted into the controller in a specific order. For example, the first module must be inserted into only the first slot 120*a*, the second module added into only the second slot 120*b*, and so forth. However, the modular controller 100 according to the present invention includes controller firmware which does not require the irrigation modules to be inserted in any specific order. For example, a module may be inserted and used in the third slot 120*c*, while another module may be later inserted and used in the first slot 120*a*, and finally another module inserted and used in the second slot 120*b*. Additionally, modules with different station counts can be mixed in a module controller 100. For example, modules with 4, 8, and 8 station counts can be connected to the first second and third slots, respectively. This feature provides the user with flexibility to add a module with any number of station counts, as opposed to prior art module controllers that limited the user to modules with the same station counts.

When an irrigation module such as modules 140, 156, 158, or 160 is inserted into the modular controller 100, the display 114 immediately displays information relating to the inserted module. For example, the display 114 may communicate the position of the newly inserted module, the station count of the module, or indicate if a sensor capability is present on the module and if so, the type of the sensor.

The display 114 may also display additional relevant information related to alerts or alarms. Specifically, an alarm situation triggers the display 114 to present information regarding the corresponding station number(s) affected within each module, as well as the type of alarm and any data relating to this alarm (e.g. the flow conditions for a flow alarm).

The software of the modular controller 100 is programmed to retain irrigation schedule and sensor data programmed by the user, even when the irrigation module is removed from the modular controller 100. Preferably, this data is retained for each module slot 120, not for the individual modules. For example, a module 140 may be inserted into the first slot 120*a* and a watering schedule programmed. If module 140 is removed and a sensor module 158 is inserted into the first slot 120*a*, the programmed irrigation schedule acts on the sensor module 158 in the first slot 120*a*. Thus, the programming data is not immediately deleted upon removing a module, reducing the overall programming time otherwise required of the user.

Integrated Wireless Rain Sensor

Figure 20:
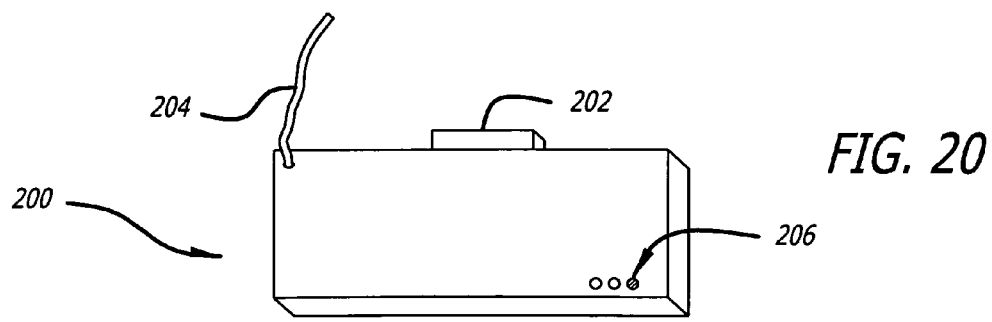
FIG. 20 illustrates a top perspective view of an internally mounted modular wireless rain sensor receiver according to the present invention.

As seen in FIG. 20, a modular wireless rain sensor receiver 200 is illustrated according to the present invention. Unlike some prior art modular controllers that allow a wireless rain sensor receiver to be merely connected as an external interrupter switch connected to an internal terminal block of the controller, the present invention integrates a modular wireless rain sensor receiver 200 within the modular controller 100 to provide power and exchange data that has been wirelessly transmitted by an affiliated wireless rain sensor. Specifically, the data port 202 connects to the auxiliary port 190 (seen in FIGS. 4 and 7 being covered by a protective cap) where it communicates moisture data to the modular controller 100. In this respect, the software of the modular controller 100 decides if and when to stop a watering cycle based on sensor data, allowing increased programming flexibility that typical rain sensors might not otherwise provide.

Prior wireless rain sensors require a moderate amount of time and attention to install. For example, 4 different wires may need securing to different screw terminals in the controller. However, the modular wireless rain sensor receiver 200 dramatically reduces install time to seconds, since the user merely plugs the module into the auxiliary port 190.

Battery Holder

Figure 12:
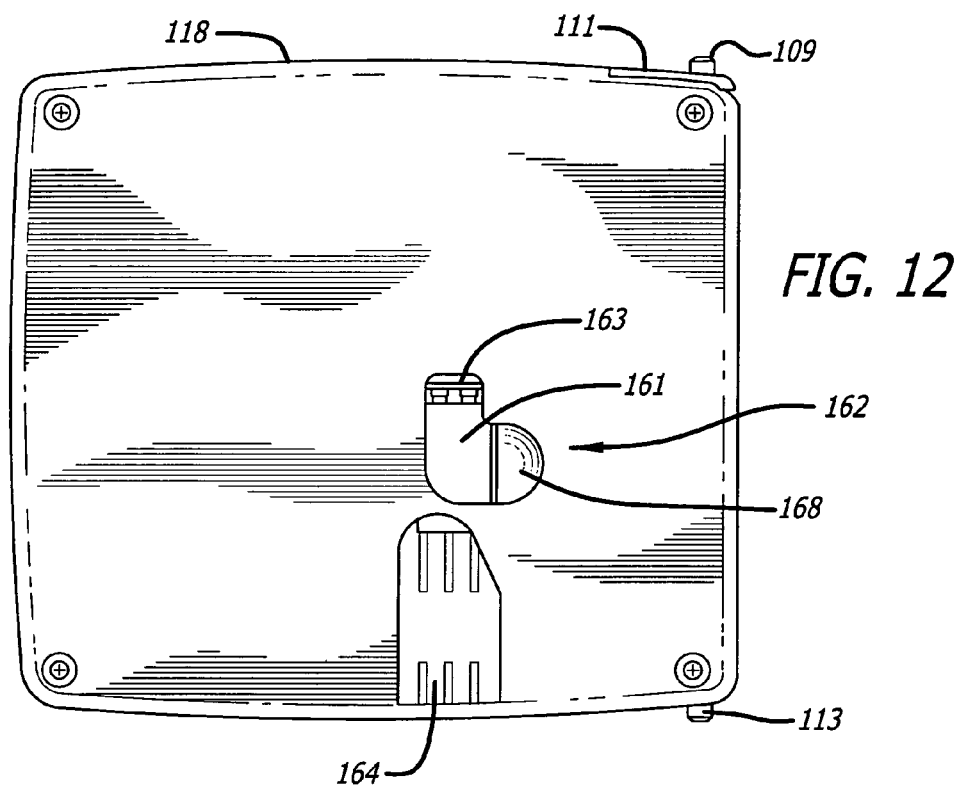
FIG. 12 illustrates a rear view of the console of FIG. 3.
Figure 13:
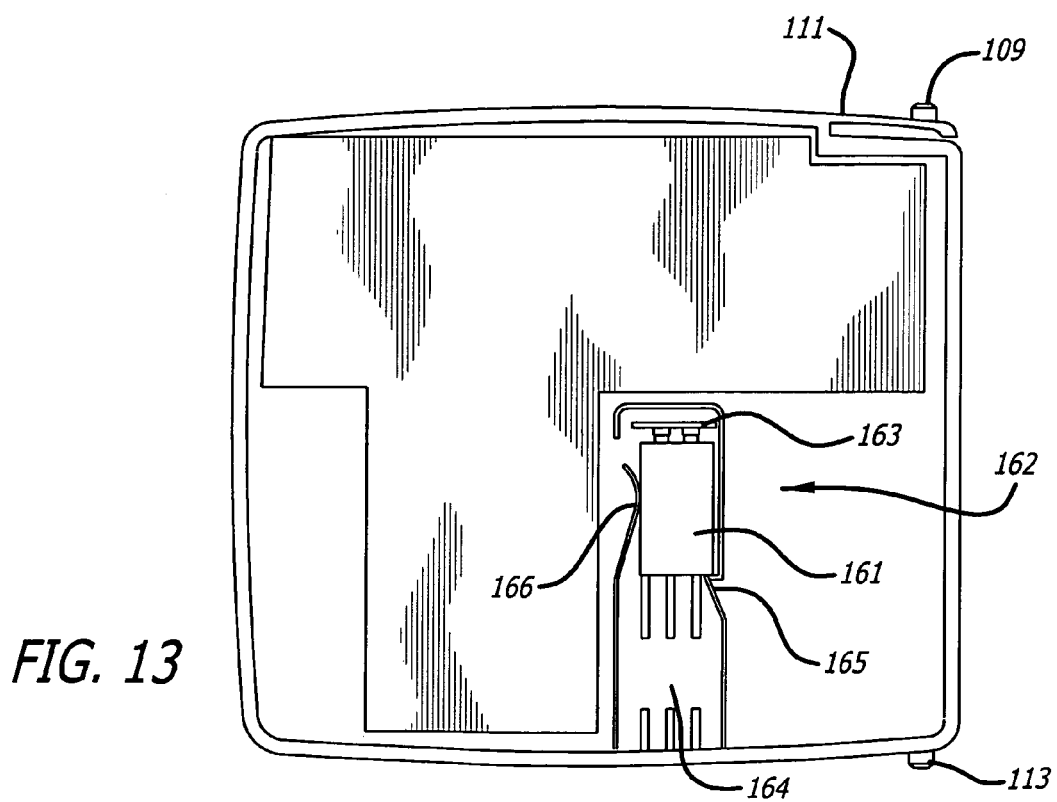
FIG. 13 illustrates a rear view of the console of FIG. 3.

As best seen in FIGS. 12 and 13, the modular controller 100 also includes a 9-volt battery holder 162 within the rear console panel 118. The battery 161 connects to the modular controller 100 through battery connector 163, providing DC power for mobile and backup purposes. For example, the battery 161 provides power to the modular controller 100 during a power failure, allowing the clock time to be maintained. In another example, the battery 161 provides power to the console 108 when removed from the controller 100, as described elsewhere in this application, allowing a user to program the console 108 at a remote location.

Preferably, the battery holder 162 is a generally rectangle slot 164, with a depth that allows the battery 161 to lie flush with the surface of the rear console panel 118. As seen with the rear console panel 118 removed in FIG. 13, the slot 164 includes a biased spring arm 166 and a triangular retaining lip 165. As the battery 161 is urged into the slot 164, the triangular retaining lip 165 deflects the battery 161 to one side of the slot 164 and further against the biased spring arm 166. As the battery 161 slides to the end of the slot 164, the end of the battery 161 moves past the triangular retaining lip 165, allowing the biased spring arm 166 to push the battery 161 horizontally to catch the triangular retaining lip 165. When a user wishes to remove the battery 161, the finger hole 168 provides access to push the battery 161 against the biased spring arm 166 and away from the triangular retaining lip 165. The battery 161 can then be slid out of the slot 164.

Remote Data Port

As best seen in FIGS. 4, 5, and 6, the modular controller 100 preferably includes a remote data port 127 that allows the user to be fully controlled by a remote control (e.g. a Toro® EZ-Remote®), provide in-circuit test fixture data, accept configuration commands for changing the ram or eeprom so as to alter program settings, or updating the firmware of the modular controller 100.

For example, a remote control device can be connected to the remote data port 127 to assert control of the controller 100 from a distance. The remote data port 127 operates by accepting various commands from the remote control device that can turn the stations on or off, call the self-test mode for the test fixture, and read and write to both the memory and eeprom. Since the ram and eeprom can be read and modified, any firmware controlled aspects of the controller can therefore be accessed and programmed remotely with the remote control device.

Simplified Flow Sensor Installation

Typically, prior art controllers require the user to "set up" a particular flow sensor in the controller by not only physically connecting the sensor but also entering in the "K" and "Offset" values associated with a specific flow sensor. These two values vary for different flow sensor models and are used in a flow sensing equation by the controller to "standardize" the readings for that particular model of flow sensor. Although these two values are often included with the flow sensor by the sensor manufacturers, they are typically long numbers with decimal points that users find difficult to enter and sometimes incorrectly enter.

The present invention simplifies the installation process for a flow sensor by including a lookup data file stored within the controller memory that contains the K and Offset values for specific flow sensor models. Instead of entering in two long, complicated numbers, the user merely selects the manufacture and model of flow sensor. The controller 100 searches through the lookup data file for the flow sensor model data entry, which also includes the corresponding K and Offset values for that particular flow sensor. The controller 100 uses these lookup values in its flow sensing equation to provide a standard flow value. In this respect, installation time for a flow sensor is reduced and the risk of entering incorrect K and Offset values is minimized.

In a specific flow meter installation example, the controller 100 first asks the user if a flow module is installed. If the user answers yes, the controller provides a list of the specific supported flow meters. If the flow meter is not on the list, the user selects a "not available" entry which then allows the user to manually enter the K and Offset values which are then downloaded to the module for use in reading the flow data. If the flow meter is on the list, the user selects the particular flow meter model. Since the K and Offset values are located in a data table associated with the list, the K and Offset values are determined and used accordingly.

Preferably, a module with flow sensing functionality utilizes the K and Offset values to calculate the actual flow from the downloaded raw sensor data. Processing this data in a module frees up the processor of the modular controller 100 for other tasks. Additionally, new functionality can be more easily added by simply adding a new module. Further, processing within the module allows other modules to easily access and utilize the flow information from a flow sensor.

User Interface

As previously discussed, the modular controller 100 allows the use of multiple modules 140, each connecting to various numbers of irrigation stations. However, the use and display of multiple modules 140 with varying numbers of irrigation stations can provide some confusion to a user, especially when programming various settings of an irrigation schedule. In this regard, the present invention provides a programming interface, as seen in the display 114 of FIG. 21, which clearly and conceptually distinguishes the irrigation stations of each module 140 to prevent user confusion when reviewing and programming an irrigation schedule.

Specifically, the display 114 includes a module identifier 300 corresponding to each of the module slots 120a-120c. Each module identifier 300 includes a corresponding irrigation station selection box 302 and a functionality icon 303. The irrigation station selection box 302 displays irrigation station numbers 301 corresponding to the irrigation stations of each module 140. Since each module may have different numbers of irrigation stations, each selection box 302 displays the appropriate irrigation station numbers.

Figure 21:
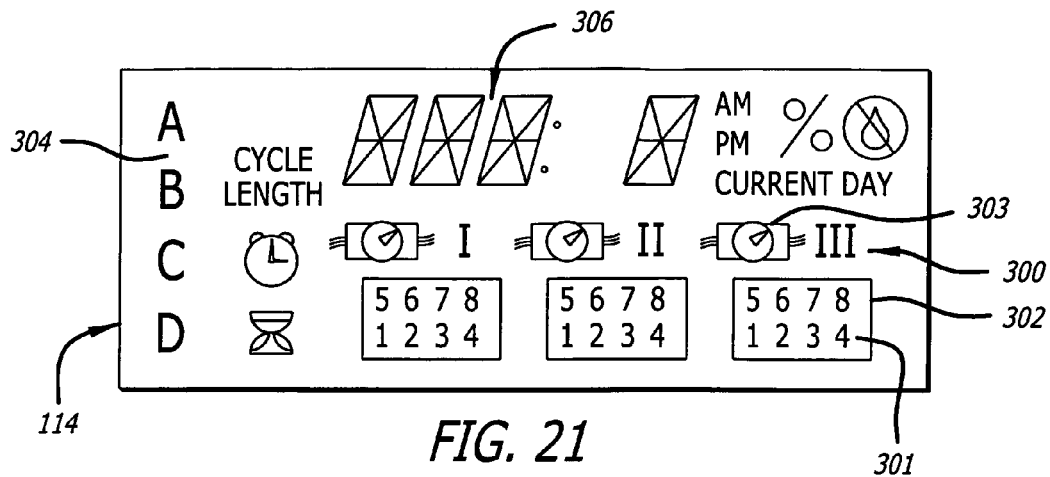
FIGS. 21-23 illustrate various views of a graphical display according to the present invention.

The functionality icon 303 communicates a functionality of the module 140 as discussed in regards to FIGS. 14-17. For example, the functionality icons 303 of FIG. 21 illustrate that Modules I, II, and III all contain flow-metering functionality. Since the functionality icon 303 is positioned near the module identifier 300, the user can easily determine the functionality of a particular module 140.

In this respect, the display 114 conceptually communicates both the functionality of a module 140 and the number of irrigation stations present on the module 140 positioned within each module slot 120a-120c.

To program specific irrigation stations, the user first selects a program that the irrigation schedule will be saved under, represented by program indicators 304 as A, B, C, and D. This can be accomplished by adjusting switch 115, seen best in FIG. 2.

Figure 22:
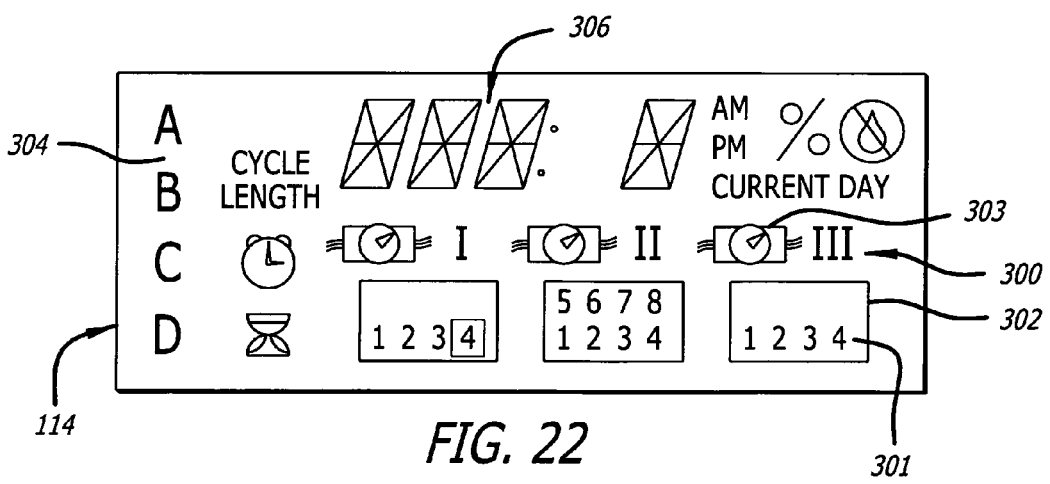
Figure 23:
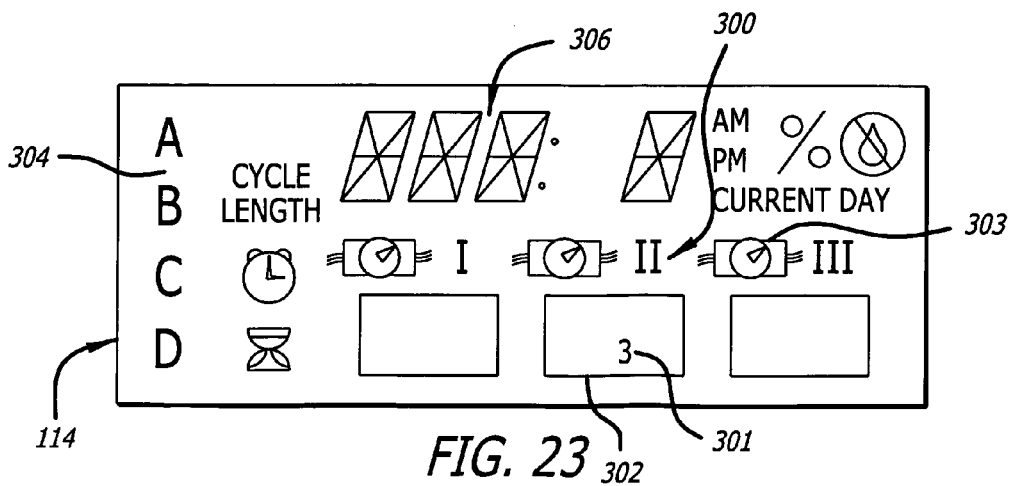

Next, the user manipulates buttons 112 seen in FIG. 2 to select an irrigation station number 301. The selected irrigation station number 301 can be displayed as "selected" by highlighting one such irrigation station number 301, such as station 4 in FIG. 22. Alternately, each irrigation station selection box 302 may be empty except for the selected irrigation station number 301, as seen in FIG. 23. Once an irrigation station number 301 is selected, irrigation schedule information, such as the station runtime, can be set in display area 306. In this respect, the user can easily cycle through the irrigation station numbers 301 for each module identifier 300 with minimal programming confusion.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. An irrigation controller comprising:
a controller housing;
a microprocessor located within said controller housing for storing and executing a watering program for controlling a plurality of irrigation stations;
an auxiliary port in communication with said microprocessor and disposed in said controller housing;
a modular rain sensor receiver removably located within said controller housing, said modular rain sensor receiver comprising:
an enclosure;
a data port disposed on an external surface of said enclosure and removably coupled to said auxiliary port; and
a wireless receiver disposed within said enclosure;
a local rain sensor adapted to measure rain, including a wireless transmitter configured to communicate rain moisture data to said modular rain sensor receiver;
wherein said auxiliary port provides power to said modular rain sensor receiver;
wherein said data port communicates said rain moisture data to said microprocessor; and wherein said microprocessor selectively interrupts said watering program from irrigation based on said rain moisture data.

2. The irrigation controller of claim 1, wherein said wireless receiver is connected to an antenna.

3. The irrigation controller of claim 1, wherein said auxiliary port is located within an internal compartment of said irrigation controller.

4. The irrigation controller of claim 1, further comprising software executable by said microprocessor; said software determining when to selectively interrupt said watering program based on said rain moisture data.

5. The irrigation controller of claim 1, wherein said irrigation controller accepts irrigation station modules for connecting irrigation stations.

* * * * *